United States Patent
LeMaire et al.

(10) Patent No.: US 8,956,540 B2
(45) Date of Patent: Feb. 17, 2015

(54) PROCESS AND APPARATUS FOR CONTROLLING AERATION DURING NITRIFICATION AND DENITRIFICATION OF WATER

(75) Inventors: Romain LeMaire, Paris (FR); Daniel Olivier, Lognes (FR)

(73) Assignee: Veolia Water Solutions & Technologies Support, Saint-Maurice (FR)

(*) Notice: Subject to any disclaimer, the term of this patent is extended or adjusted under 35 U.S.C. 154(b) by 0 days.

(21) Appl. No.: 13/577,384

(22) PCT Filed: Dec. 23, 2011

(86) PCT No.: PCT/EP2011/074008
§ 371 (c)(1), (2), (4) Date: Oct. 11, 2012

(87) PCT Pub. No.: WO2012/085288
PCT Pub. Date: Jun. 28, 2012

(65) Prior Publication Data
US 2013/0256217 A1  Oct. 3, 2013

(30) Foreign Application Priority Data

Dec. 24, 2010 (FR) ..................... 10 61255

(51) Int. Cl.
C02F 3/00 (2006.01)
C02F 3/30 (2006.01)
C02F 3/26 (2006.01)
C02F 3/12 (2006.01)
C02F 3/20 (2006.01)
C02F 101/16 (2006.01)

(52) U.S. Cl.
CPC .............. *C02F 3/302* (2013.01); *C02F 3/006* (2013.01); *C02F 3/26* (2013.01); *C02F 3/30* (2013.01); *C02F 3/1263* (2013.01); *C02F 3/20* (2013.01); *C02F 3/301* (2013.01); *C02F 2101/16* (2013.01); *C02F 2101/166* (2013.01); *C02F 2209/001* (2013.01); *C02F 2209/003* (2013.01); *C02F 2209/14* (2013.01); *C02F 2209/15* (2013.01); C02F 2209/22 (2013.01); *C02F 2209/225* (2013.01); *C02F 2209/38* (2013.01)
USPC ........... 210/614; 210/620; 210/739; 210/143; 210/150; 210/220

(58) Field of Classification Search
USPC .................. 210/614, 620, 739, 143, 150, 220
See application file for complete search history.

(56) References Cited

U.S. PATENT DOCUMENTS 7,153,429 B1    12/2006  Pedros
2006/0131232 A1  6/2006  Rosen et al.

FOREIGN PATENT DOCUMENTS

| CN | 101880111 A | 11/2010 |
| EP | 1721870 A1 | 11/2006 |
| JP | 200308889 A | 3/2003 |
| WO | 2010074008 A1 | 7/2010 |
| WO | 2010106487 A1 | 9/2010 |

OTHER PUBLICATIONS

Meyer, U., et al. "Fuzzy-control for improved nitrogen removal and energy saving in WWT-plants with pre-denitrification", Water Science and Technology, pp. 69-76 (Dec. 31, 2003).

*Primary Examiner* — Chester Barry
(74) *Attorney, Agent, or Firm* — Coats and Bennett PLLC (57) ABSTRACT

A process for treating water that includes ammonium. The water is directed to a biological reactor and the quantity of nitrates formed in the reactor and the quantity of ammonium reduced in the reactor is determined. A ratio of the quantity of nitrates formed to the quantity of ammonium reduced is determined. Further, the percentage of ammonium reduced is also determined. The water in the biological reactor is aerated by injecting oxygen into the reactor where the amount of oxygen injected is a function of the ratio and the percentage of ammonium reduced in the reactor.

16 Claims, 3 Drawing Sheets

PRIOR ART

Fig. 1

PRIOR ART

PROCESS AND APPARATUS FOR CONTROLLING AERATION DURING NITRIFICATION AND DENITRIFICATION OF WATER

1. FIELD OF THE INVENTION

The field of the invention is that of the treatment of water charged with nitrogen in the form of ammonium. The invention can be applied especially in the treatment of industrial or municipal effluents such as anaerobic digester supernates, effluents from the treatment of sludge by wet oxidation, gas treatment condensates, condensates from the treatment of wastewater sludge, discharge lixiviates, slaughterhouse effluents, liquid pig manure or any other type of effluent charged with nitrogen in ammonium form.

More specifically, the invention pertains to a process of water treatment implementing a biological reactor within which there is especially implemented at least one aerated biological treatment step.

2. PRIOR ART

Biological water treatment processes are commonly used to reduce the nitrogen pollution content of water.

These biological processes include a process of nitrification-denitrification which can be implemented continuously or sequentially.

Such a process consists of the introduction of a water to be treated into a biological reactor within which aerated and anoxic phases are implemented.

During the aerated phases, the injection of oxygen (in the form of air or pure oxygen for example) into the reactor promotes the growth of an autotrophic nitrifying biomass enabling the conversion of nitrogen in ammonium form ($NH_4^+$) into nitrates ($NO_3^-$). This biomass is in fact constituted by a biomass that converts nitrogen in ammonium form ($NH_4^+$) into nitrites ($NO_2^-$) and is known as an AOB ("Ammonia Oxidizing Bacteria") biomass and a biomass that converts the nitrites ($NO_2^-$) into nitrates ($NO_3^-$) and is known as an NOB (Nitrite Oxidizing Bacteria") biomass.

During the anoxic phases, stopping the aeration of the reactor promotes the growth of a denitrifying biomass which reduces the nitrates into molecular nitrogen gas (diazote) $N_2$ in passing through the nitrite stage. This denitrifying biomass is heterotrophic in nature, i.e. it cannot grow except in the presence of a source of organic carbon.

Figure 1:
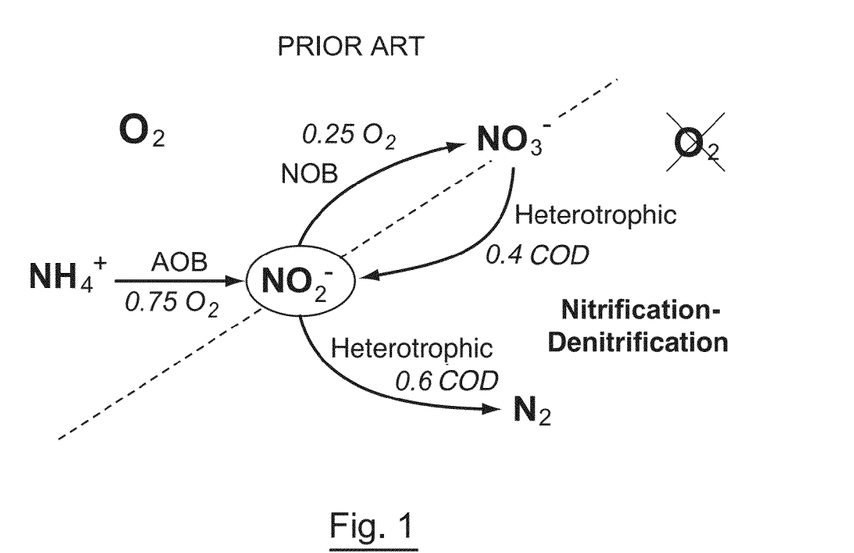
FIG. 1 is a drawing of a prior-art process for reducing nitrogen pollution by nitrification-denitrification.

This process of reducing nitrogen pollution by nitrification-denitrification is shown schematically in FIG. 1.

A biological treatment process of this kind is particularly efficient because its implementation leads to a non-negligible reduction of the nitrogen pollution content of water. However, it has some drawbacks. In particular, its implementation requires the injection into the reactor of a relatively large quantity of oxygen to ensure the conversion of the ammonium into nitrates. Furthermore, most of the water to be treated has an organic pollution content (BOD or Biochemical Oxygen Demand) that is far too low to enable the satisfactory reduction of nitrogen pollution by nitrification-denitrification. It is thus often necessary to inject carbon into the reactor in the form of reagents (for example an easily biodegradable carbon substrate) so that the heterotrophic type bacteria can ensure the elimination of the nitrates in satisfactory quantities.

Such a process of treatment by nitrification-denitrification is thus relatively costly to implement because of the fairly large consumption of oxygen and of carbon reagent that it entails.

In order to at least partially mitigate these drawbacks, a process has been developed aimed at reducing pollution in ammonium form by minimizing the formation of nitrates. This process, known as nitritation-denitritation is also called the "nitrates-shunt" process and consists of the introduction of water to be treated into a sequential biological reactor within which there are implemented aerated phases and anoxic phases in operational conditions providing selective pressure for the growth of AOB bacteria to the detriment of the NOB bacteria. These operational conditions may be high concentration in ammonium ($NH_4^+$), low concentration in dissolved oxygen during the aerated phases, temperature above 28° C., a low age of sludge or several operational conditions combined.

During the aerated phases, the injection of oxygen into the reactor enables the growth of AOB type bacteria which act on the ammonia nitrogen ($NH_4^+$) to form nitrites ($NO_2^-$). The use of a sequential biological reactor to implement a "nitrates-shunt" type process gives high ammonium concentrations after each sequence of supplying water to be treated into the reactor. Since the NOB bacteria are more inhibited by high ammonium concentrations than the AOB bacteria, their growth is thus limited. Besides, the oxygen is injected in such a way as to preferably maintain a low concentration of dissolved oxygen in the reactor, in order to promote the growth of AOB bacteria to the detriment of NOB bacteria because of a greater affinity for oxygen on the part of the AOB bacteria. The production of nitrates from nitrites by the NOB biomass is thus limited.

During anoxic phases, the role of the heterotrophic biomass is essentially that of converting the nitrites into molecular nitrogen, the nitrate content being low. This heterotrophic biomass competes with the NOB biomass for the consumption of nitrites and contributes to limiting the growth of the NOB biomass.

Figure 2:
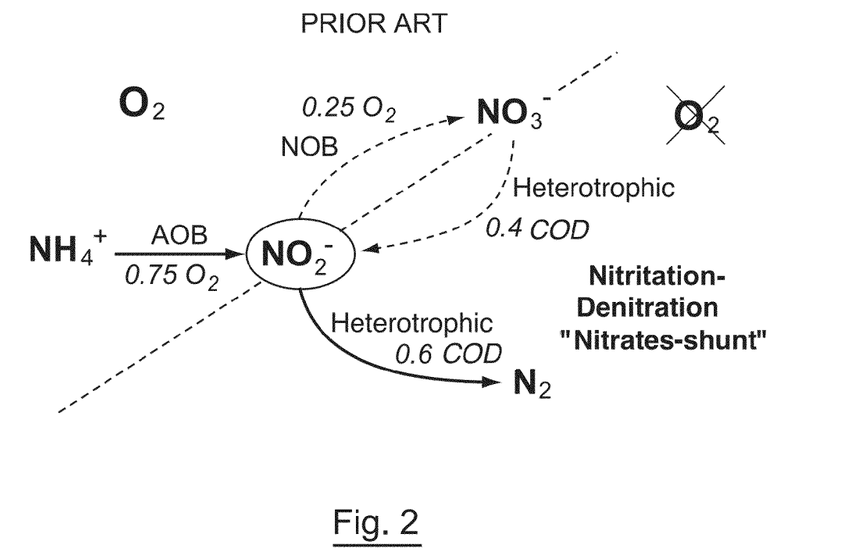
FIG. 2 is a drawing of a prior-art process for reducing nitrogen pollution by "nitrates-shunt" nitritation-denitritation.

This process of reducing nitrogen pollution by "nitrate shunt" is shown schematically in FIG. 2.

The implementation of such a nitritation-denitritation process, as compared with a classic nitrification-denitrification process described in FIG. 1, reduces oxygen consumption by about 25% and carbon reagent consumption by about 40%. It thus reduces the nitrogen pollution of water satisfactorily and more economically.

There is another biological process known in the prior art called the "nitritation-deammonification" process. This process further reduces the cost inherent in the treatment of the nitrogen pollution of water.

In such a process, water to be treated is introduced into a sequential biological reactor within which aerated phases and anoxic phases are implemented, in minimizing the formation of nitrates by selective operational conditions and implementing a specific biomass known as an "anammox" biomass.

During the aerated phases, the implementation of the same operational conditions as those described here above for the "nitrates-shunt" process enables the selection of AOB bacteria to the detriment of the NOB bacteria and minimizes the production of nitrates from nitrites by the NOB biomass.

During the anoxic phases, anammox type bacteria grow and act on the ammonium ions and on the nitrites to form molecular nitrogen gas ($N_2$) as well as a small quantity of nitrates without consuming organic carbon since these are autotrophic bacteria, unlike the heterotrophic biomass responsible for the denitritation step in the "nitrates-shunt" process.

When the denitritation step, consisting of the degradation of nitrites into molecular nitrogen gas ($N_2$), involves anammox type bacteria, this step known as a denitritation step is more specifically called deammonification.

The implementation of such a "nitritation-deammonification" process, as compared with a classic "nitrification-denitrification" process reduces oxygen consumption by about 60% and carbon reagent consumption by about 90%. It thus reduces the nitrogen pollution of water satisfactorily and even more economically.

Figure 3:
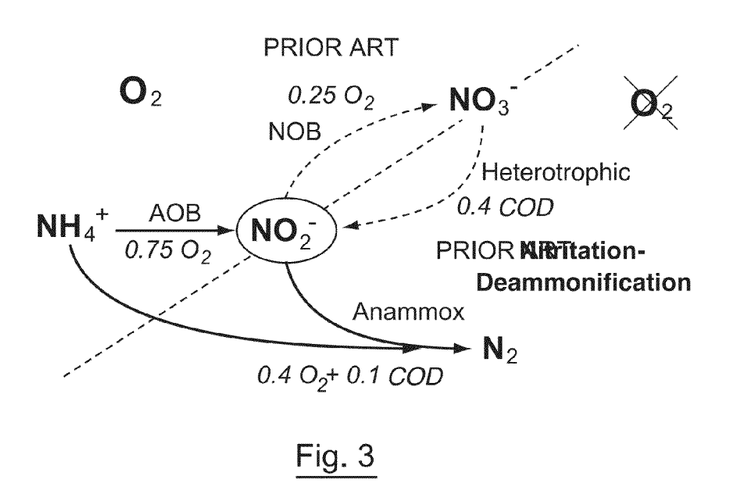
FIG. 3 is a drawing of a prior-art process for reducing nitrogen pollution by nitritation-deammonification.

This process for reducing nitrogen pollution by "nitritation-deammonification" is shown schematically in FIG. 3.

The "nitrates-shunt" or "nitritation-deammonification" type processes can be implemented continuously or sequentially.

When applying the "nitrification-denitrification", "nitrates-shunt" or "nitritation-deammonification" type processes, the nitrification and denitrification steps or the nitritation and denitritation/deammonification steps can be implemented simultaneously with or without a biomass support material. In this case, the aeration of the reactor may be continuous.

The present invention concerns processes of biological treatment by nitritation-denitritation comprising at least one aerated step and especially these latter two steps of water treatment by nitritation-denitritation of the "nitrates-shunt" and "nitritation-deammonification" type which, compared with the classic processes of water treatment by nitrification-denitrification, have the advantage of reducing the ammonium contained in water while at the same time limiting the consumption of oxygen and of carbon substrate.

In practice, it has proved to be fairly difficult to prevent the formation of nitrates when implementing these types of processes whereas their implementation is aimed precisely at preventing such formation. Indeed, in classical conditions of implementation, the nitrites produced by the AOB bacteria from ammonium are directly oxidized by the NOB bacteria to form nitrates.

Techniques of regulation have therefore been developed so as to achieve better control over the different reactions involved in the implementation of processes of this type and especially to prevent the formation of nitrates.

Thus, to favor the activity of AOB bacteria to the detriment of NOB bacteria and thus limit the formation of nitrates, there are known ways of acting on different parameters:
- the temperature within the reactor: beyond a temperature of about 25 to 28° C., the speed of proliferation of the AOB bacteria is greater than that of the NOB bacteria;
- the ammonium concentration in the reactor: beyond a certain concentration of ammonium, the activity of the NOB bacteria is inhibited;
- the dissolved oxygen concentration: a low dissolved oxygen concentration limits the activity of the NOB bacteria to the benefit of the AOB bacteria;
- the time of stay of sludge in the reactor.

Taking account of at least one of these parameters can efficiently reduce the nitrogen pollution content of water while restricting the formation of nitrates and improving control over the oxygen consumption and, as the case may be, the consumption of carbon reagents.

3. DRAWBACKS OF THE PRIOR ART

Although taking at least one of these parameters into account improves the implementation of the biological treatment processes that comprise at least one aerated step, such as the nitrification-denitrification, "nitrates-shunt" and "nitritation-deammonification" type processes, it cannot optimize the aeration of the reactor.

Indeed, in the implementation of such processes, aeration consists of the permanent or intermittent injection of oxygen into the reactor according to a fixed set value of flow rate or concentration. The quantity of oxygen injected into the reactor over a given period is therefore fixed.

However, the ammonium concentration of water to be treated as well as the biological activity within the reactor varies over time. Consequently, the requirements in dissolved oxygen in the reactor fluctuate over time.

There are then periods during which the quantity of oxygen dissolved in the reactor is too great (over-aeration) so that the nitrates are formed sometimes in large quantities. The gains in terms of reduction of oxygen consumption and prevention of the formation of nitrates as anticipated from the implementing of processes of this type are then reduced. There also exist periods during which the quantity of dissolved oxygen in the reactor is insufficient (under-aeration). The efficiency of the process in terms of reduction of ammonium concentration is then limited.

The prior art regulation techniques therefore do not dynamically optimize the oxygen input in a biological reactor implementing a water treatment process with at least one aerated step in such a way as to adapt the aeration of the reactor to requirements and limit the oxygen consumption and the formation of nitrates accordingly.

4. GOALS OF THE INVENTION

The invention is aimed especially at overcoming these drawbacks of the prior art.

More specifically, it is a goal of the invention, in at least one embodiment, to improve the performance of biological type water treatment processes comprising at least one aerated nitritation step.

In particular, it is a goal of the invention, in at least one embodiment, to implement a technique of this kind to reduce the quantity of nitrates formed during its implementation.

The invention is also aimed, in at least one embodiment, at procuring a technique of this kind that provides for greater mastery over the aeration of the reactor within which it is implemented.

In particular, the invention is aimed, in at least one embodiment, at providing such a technique for dynamically adapting the aeration of the reactor to match it with requirements. The invention also pursues the goal, in at least one embodiment, of providing a technique of this kind that is more economical to implement than the prior-art techniques.

5. SUMMARY OF THE INVENTION

These goals, as well as others that shall appear here below, are achieved by means of a process for treating water charged with nitrogen in ammonium form within a biological reactor by nitritation-denitritation, said process including at least:
- a step (i) for supplying said biological reactor with said water;
- an aerated step (ii) during which oxygen is injected into the reactor;
- a step (iii) for extracting treated water from said reactor;

According to the invention, such a process further includes:
- a step for determining a piece of information representative of the quantity of nitrates formed in said reactor;
- a step for determining a piece of information representative of the quantity of ammonium reduced in said reactor;
- a step for computing the ratio between said piece of information representative of the quantity of nitrates formed in said reactor and said piece of information representative of the quantity of ammonium reduced in said reactor;

a step for determining the percentage of ammonium reduced in said reactor;

said steps for determining being implemented continuously or intermittently according to a predetermined frequency, the intake of oxygen into said reactor during said aerated step (ii) being determined as a function of said ratio between said piece of information representative of the quantity of nitrates formed in said reactor and said piece of information representative of the quantity of ammonium reduced in said reactor and as a function of said percentage of ammonium reduced in said reactor.

Thus, the invention relies on a wholly original approach in which the oxygen intake is regulated within a biological reactor wherein there is implemented a biological type of process for treating water by nitritation-denitritation comprising at least one aerated step as a function of the percentage of ammonium reduced in the reactor on the one hand and as a function of the ratio between the quantity of nitrates formed in the reactor and the quantity of ammonium reduced in the reactor on the other hand.

The inventors have indeed observed that, when the ratio between the quantity of nitrates formed in the reactor and the quantity of ammonium reduced in the reactor increases, implying that the production of nitrates is increasing and/or that the reduction of ammonium is diminishing, the conditions in the reactor are such that they favor the growth of NOB bacteria to the detriment of the AOB bacteria. It is then possible to act on the quantity of oxygen injected into the reactor so as to promote the growth of the AOB bacteria to the detriment of the NOB bacteria in order to favor the reduction of the ammonium and limit the production of nitrates.

The inventors have observed however that they could be situations during which the reduction of the ammonium becomes excessively low so that the efficiency of the process in terms of ammonium reduction deteriorates.

The fact of taking account, combinedly, of the percentage of ammonium reduced in the reactor on the one hand and the ratio between the quantity of nitrates formed in the reactor and the quantity of ammonium reduced in the reactor on the other hand makes it possible, according to the invention, to dynamically adapt the oxygen input in the reactor so as to limit the production of nitrates while maintaining adequate ammonium reduction to ensure the efficiency of the process.

Implementing the technique of the invention therefore improves the performance of a biological type of water treatment having at least one aerated step, and does so in terms of both ammonium reduction and oxygen consumption.

The technique of the invention which is a process aimed at reducing the ammonium content therefore improves the efficiency of a biological type of water treatment with one aerated step while at the same time limiting the cost of its implementation.

As understood in the invention, the oxygen input determined during the implementation of such a process could, for example, be expressed in terms of a flow rate of oxygen injected into the reactor or it may correspond to a set value of concentration of dissolved oxygen in the reactor delivered with aeration means known per se to those skilled in the art.

A process according to the invention can be implemented continuously. In this case, the water to be treated is introduced continuously into the reactor and the treated water is extracted therefrom continuously.

A process according to the invention can also be implemented sequentially. In this case, the water to be treated is introduced into the reactor. Once the supply to the reactor is completed, the water that it contains is treated biologically. Once the biological treatment is completed, the treated water is extracted from the reactor. In one variant, the water to be treated could be introduced into the reactor in successive fractions, a fresh supply to the reactor being made after the portion previously introduced into the reactor has been treated therein. In this case, the treated water will be extracted from the reactor after the high level of the reactor has been reached and after the entire volume of water that it contains has been treated.

The technique of the invention can be implemented in combination with other processes of selective pressure aimed at promoting the activity of the nitritizing bacteria (AOB), relating for example to the temperature within the reactor, the age of the sludge, the concentration in dissolved $NH_3$ in the reactor or any combination of these three factors.

The aerated step is a phase during which nitrites are formed. In other words, this is a nitritation step which tends to limit or even eliminate the formation of nitrates by the management of aeration according to the invention. A process according to the invention can therefore generally include at least one anoxic denitritation step. As understood in the invention, the denitritation is a step during which nitrites are broken down into molecular nitrogen gas. This breakdown can involve heterotrophic type bacteria and/or anammox type bacteria. When the denitritation step involves anammox type bacteria, this step is more specifically called "deammonification".

The nitritation and denitritation steps could be implemented alternately. There are then phases of aeration and phases of non-aeration of the reactor. The nitritation and denitritation steps could also be implemented simultaneously. In this case, the aeration of the reactor can be continuous. In the case of deammonification, supports placed in an MBBR (Moving-Bed Biofilm Reactor) type reactor could serve for the growth of the biomass in the form of biofilm enabling continuous aeration of the reactor. Other techniques could be implemented to enable the biomass to grow in the form of a biofilm in such a way that the reactor can be aerated continuously. These techniques include especially techniques of biomass self-aggregation in granule form which does not require the implementation of a biomass support material.

The steps for determining a piece of information representing the quantity of nitrates formed and the quantity of ammonium reduced are performed throughout the process, continuously or intermittently according to a predetermined frequency, in the context of both continuous-mode operation and sequenced-mode operation.

According to one advantageous characteristic, a process according to the invention comprises a step for determining a variation in set value of oxygen intake as a function of said ratio between said piece of information representative of the quantity of nitrates formed in said reactor and said piece of information representative of the quantity of ammonium reduced in said reactor and as a function of said percentage of ammonium reduced in said reactor, and a step for determining a new value of oxygen intake corresponding to the sum of a current set value of oxygen intake into said reactor and said set value of variation in oxygen intake variation.

This implementation takes account of the inertia of the biological processes involved in the implementation of the process and smooths the set value of aeration on the basis of the current the set value in order to prevent excessively sudden changes of aeration.

In this case, a process according to the invention comprises a step for determining a first contribution, to said set value of variation in oxygen, from said ratio between said piece of information representative of the quantity of nitrates formed in said reactor and said piece of information representative of the quantity of ammonium reduced in said reactor, and a step for determining a second contribution, to said variation in set value of oxygen intake, from said percentage of ammonium reduced in said reactor, said variation in set value of oxygen intake being a function of said first and second contributions.

This implementation makes it possible to deliver a precise set value of aeration that limits oxygen consumption and the production of nitrites while at the same time ensuring a high level of elimination of ammonium.

A process according to the invention preferably includes a step for tracking the progress over time of the value of said ratio between said piece of information representative of the quantity of nitrates formed in said reactor and said piece of information representative of the quantity of ammonium reduced in said reactor, the quantity of oxygen injected into said reactor during said aerated step (ii) being reduced when the value of said ratio increases.

Diminishing the quantity of oxygen injected into the reactor when there is an increase in the ratio between the quantity of nitrites formed in the reactor and the quantity of ammonium reduced in the reactor promotes the growth of AOB bacteria to the detriment of NOB bacteria and therefore limits the production of nitrates.

In this case, a process according to the invention preferably includes a step for comparing the value of said percentage of ammonium reduced in said reactor with a threshold value, the quantity of oxygen injected into said reactor during said aerated step (ii) being increased when the value of said percentage is lower than said threshold value.

The fact of injecting more oxygen into the reactor when the percentage of ammonium reduced therein reaches a predetermined minimum threshold promotes the growth of AOB bacteria so as to ensure a suitable reduction of the ammonium.

According to an advantageous characteristic of the invention, said step for determining a piece of information representative of the quantity of nitrates formed in said reactor includes a step for measuring the nitrate concentration of said water and of said treated water in said reactor, or a step for measuring the nitrate concentration of said water upstream to said reactor and a step for measuring the nitrate concentration of the treated water in or downstream from said reactor.

It is thus possible to simply and precisely determine the quantity of nitrates formed in the reactor at each instant from the data thus measured.

According to another advantageous characteristic of the invention, said step for determining a piece of information representative of the quantity of ammonium reduced in said reactor includes a step for measuring the ammonium concentration of said water and of said treated water in said reactor, or a step for measuring the ammonium concentration of said water upstream to said reactor and a step for measuring the ammonium concentration of said treated water in or downstream from said reactor.

Thus the quantity of ammonium reduced in the reactor can be determined simply and precisely at each instant on the basis of the data thus measured.

According to a preferred characteristic of the invention, said steps for measuring nitrate and/or ammonium concentrations are carried out online and continuously.

The quantity of oxygen injected into the reactor may be modified dynamically, i.e. in real time on the basis of requirements.

According to another preferred characteristic of the invention, the oxygen intake into said reactor is determined according to a predetermined time interval.

The time between the issuing of two successive set values of aeration could thus be chosen so that it is:
- neither too short in which case a new set value of aeration could be delivered while the biological processes involved in the implementation of the process are not balanced;
- nor too long, in which case a new set value of aeration could be delivered while the conditions that led to its determining have changed.

The present invention also pertains to a plant for treating water, the plant comprising:
- a biological reactor having an inlet for water to be treated and an outlet for treated water;
- means for measuring a piece of information representative of the concentration of ammonium placed in said reactor, or upstream to said inlet and downstream from said outlet or in said reactor;
- means for measuring a piece of information representative of the concentration of nitrates placed in said reactor, or upstream to said inlet and downstream from said outlet or in said reactor;
- means for computing a reduction in ammonium for water circulating in said reactor, using at least some of said pieces of information;
- means for computing a quantity of nitrates formed in said water circulating in said reactor, using at least some of said pieces of information;
- means for computing the ratio between said quantity of nitrates formed and said quantity of ammonium reduced;
- means for computing a percentage of ammonium reduction for the water circulating in said reactor from at least some of said pieces of information;
- means for injecting oxygen into said reactor;
- means for determining the quantity of oxygen injected into said reactor via said injection means, from said ratio and said percentage of reduction.

When the biological reactor is intended for implementation in sequential mode, the means for measuring a piece of information representing the nitrate concentration and ammonium concentration will advantageously be placed in the reactor. When the biological reactor is intended for implementation in continuous mode, the means for measuring a piece of information representing the concentration in nitrates will be advantageously placed upstream to the inlet to the reactor and downstream from the outlet of the reactor or in said reactor, and the means for measuring a piece of information representing the ammonium concentration will advantageously be placed upstream to the inlet of the reactor and downstream from the outlet of the reactor or in said reactor.

6. LIST OF FIGURES

Other features and advantages of the invention shall appear more clearly from the following description of preferred embodiments, given by way of simple illustrative and non-restrictive examples, and from the appended drawings, of which.

7. DESCRIPTION OF EMBODIMENTS OF THE INVENTION

7.1. Reminder of the Principle of the Invention

The general principle of the invention relies on regulating the oxygen input within a biological reactor in which there is implemented a process of water treatment comprising at least one aerated step based on the percentage of ammonium reduced in the reactor on the one hand and on the ratio between the quantity of nitrates formed in the reactor and the quantity of ammonium reduced in the reactor on the other hand.

By taking account of the ratio between the quantity of nitrates formed in the reactor and the quantity of ammonium reduced in the reactor in combination with the percentage of ammonium reduced in the reactor, it is possible, according to the invention, to dynamically adapt the quantity of oxygen injected into the reactor to requirements so as to limit the production of nitrates while maintaining adequate ammonium reduction to ensure the efficiency of the process.

7.2 Examples of Embodiments of Water Treatment Plants According to the Invention

7.2.1. Plant Designed to Work in Continuous "Nitritation-Deammonification" Mode Referring to FIG. 4, we present an embodiment of a water treatment plant according to the invention.

Figure 4:
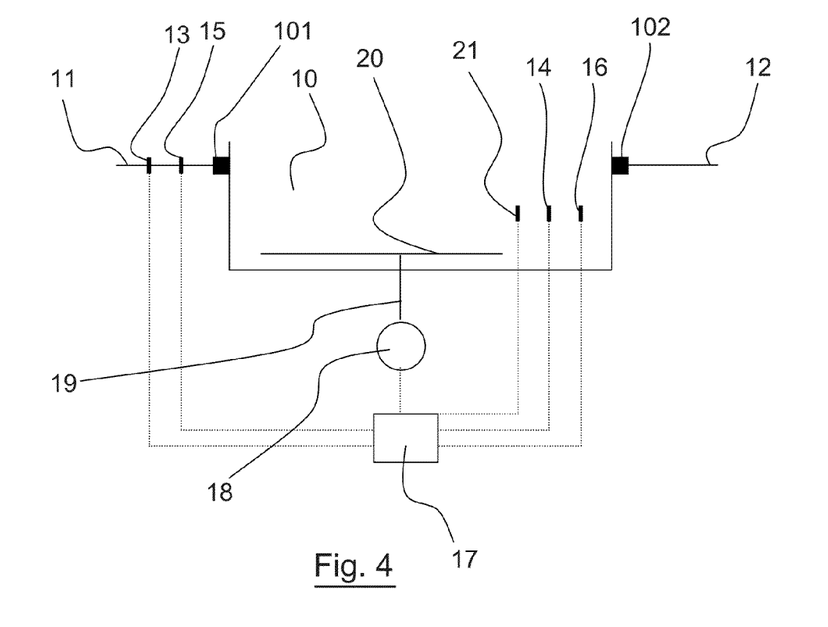
FIG. 4 is a drawing of an example of a water treatment plant according to the invention.

As shown in this FIG. 4, such a plant comprises a biological reactor 10. This biological reactor 10 comprises an inlet of water to be treated 101 and an outlet of treated water 102. In this embodiment, the reactor contains a support 50 on which biomass can grow. The reactor 10 is therefore of an MBBR type.

These supports are preferably made of plastic.

In certain variants, it is possible to place no support materials in the reactor 10. In certain cases, the biomass could for example get auto-aggregated in the form of flocs or even granules. It could also take the form of classic activated sludge.

A conduit of water to be treated 11 opens into the inlet 101 of the biological reactor 10.

A conduit of treated water 12 is connected to the outlet 102 of said biological reactor 10.

Means for measuring a piece of information representing the ammonium concentration of the water to be treated 13 are placed on the conduit 11. Means for measuring a piece of information representing the ammonium concentration of the treated water 14 are placed in the reactor 10. In this embodiment, these measuring means 13, 14 include concentration measuring sensors. In variants, other equivalent means could be implemented.

Means for measuring a piece of information representing the nitrate concentration of the water to be treated 15 are placed on the conduit 11. Means for measuring a piece of information representing the nitrate concentration of the treated water 16 are placed in the reactor 10. In this embodiment, these measuring means 15, 16 include concentration measurement sensors. In variants, other equivalent means could be implemented.

The plant also comprises means for measuring the concentration in dissolved oxygen in the reactor 10 which, in this embodiment include a dissolved oxygen sensor 21.

The measuring means 13, 14, 15, 16 and 21 are connected to a controller 17.

The controller 17 comprises means for computing:
- a reduction in ammonium by subtracting the piece of information delivered by the ammonium sensor placed upstream to the reactor 10, representing the concentration of water to be treated in ammonium, from the information delivered by the ammonium sensor placed in the reactor 10
- a quantity of formed nitrates by subtracting the information delivered by the nitrates sensor placed in the reactor 10 representing the nitrate concentration of treated water from the information delivered by the nitrates sensor placed upstream to the reactor 10 representing the nitrate concentration of the water to be treated;
- the ratio between said formed quantity of nitrates and the reduction of ammonium;
- a percentage of reduction of ammonium by subtraction of the information delivered by the ammonium sensor placed upstream to the reactor 10 from the information delivered by the ammonium sensor placed in the reactor 10, and the division of the result obtained by the piece of information delivered by the ammonium sensor placed upstream to the reactor 10.

From the ratio and the reduction of ammonium, the controller 17 determines a set value of quantity of oxygen to be injected into the reactor 10. This set value could be a set value of the rate of injection of oxygen or of the concentration of dissolved oxygen in the reactor 10. As shall be explained in greater detail here below, in this embodiment, the controller 17 works according to a linear type regulation technology. In variants, it could work according to a fuzzy logic type of technology or according to any other type of regulation technology capable of taking the progress of two parameters into account.

The controller 17 is connected to means for injecting oxygen which, in one embodiment, comprises a pressure booster 18.

The pressure booster 18 is connected by means of a conduit 19 to air diffusion means which, in this embodiment, include a diffusion array 20 for diffusing fine bubbles.

7.2.2. Plant Designed to Work in Sequential Mode

A water treatment plant designed to work in sequential mode is identical to the one designed to work in continuous mode except that:
- the measuring means 13 and 15 placed upstream to the inlet 101 of the replaced by means for measuring the ammonium concentration and means for measuring the nitrate concentration placed in the reactor 10;
- the biological reactor 10 is of an SBR (Sequencing Batch Reactor) type and contains no support for the biomass.

7.3 Example of Embodiments of Water Treatment Processes According to the Invention

7.3.1 Continuous Mode Operation

A/ General Principle

A description shall now be provided of a process of water treatment by nitritation-denitritation according to the invention of the "nitritation-deammonification" type working in continuous mode.

Such a process comprises:
a step (i) for supplying water to the biological reactor 10;
an aerated nitritation step (ii);
an anoxic denitritation step (ii')
a step (iii) for extracting treated water from said reactor.

The step (i) for supplying water consists of the continuous introduction of the water to be treated circulating in the conduit 11 into the reactor 10 through the inlet 101.

Oxygen is injected continuously but variably into the reactor 10 through the pressure booster unit 18, the conduit 19 and the diffusion array 20.

Figure 5:
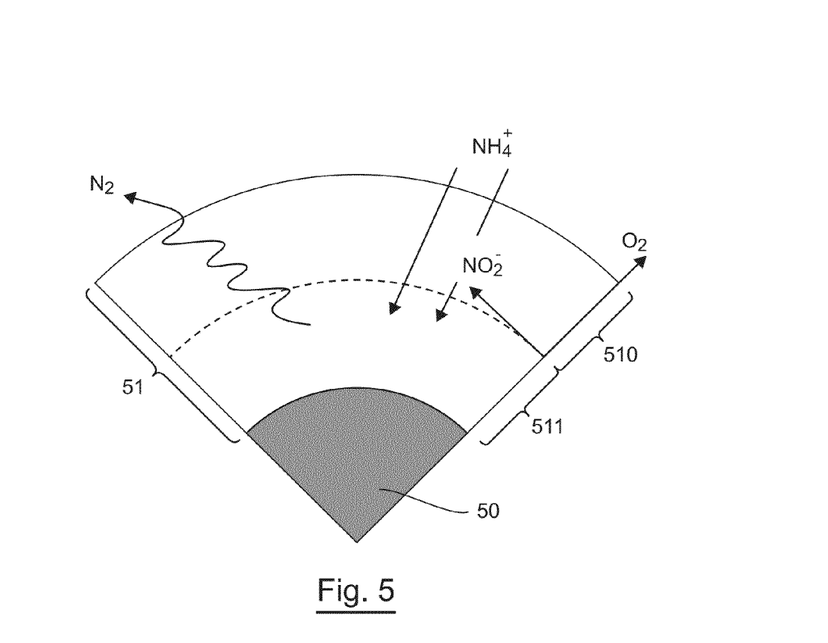
FIG. 5 illustrates a view in section of a quarter of a biomass support that can be used during the implementation of a process according to the invention applying "nitritation-deammonification" in continuous mode.

As can be seen in FIG. 5, biomass grows on the support materials 50 and forms a biofilm 51 on their surface. This biomass includes aerobic bacteria 510 (AOB and NOB) and anammox anaerobic bacteria 511.

Given the oxygen gradient within the biofilm 51, an activity of the bacteria AOB is then observed in the upper layers of this biofilm: an aerated step (ii) of nitritation is thus implemented.

During the aerated nitritation step (ii), the AOB bacteria act on the ammonium ions present in the water contained in the biological reactor 10 to form nitrites in consuming oxygen.

Very low activity on the part of the NOB bacteria can also be observed in the upper layers of the biofilm 51. These bacteria can act on the nitrites formed by the AOB bacteria to form nitrates by consuming oxygen.

In this embodiment, the process comprises an anoxic denitritation step (ii'). This denitritation takes place simultaneously with the nitritation step.

The anoxic denitritation step (ii') implements anammox bacteria to break down the nitrites into molecular nitrogen gas during the anoxic denitritation phases.

When the process is of the "nitritation-deammonification" type, the anammox bacteria that have grown in the lower layers of the biofilm 51 act, during the anoxic denitritation step (ii') on the ammonium and on the nitrites present in the water to form molecular nitrogen gas.

The treated water is continuously extracted from the reactor 10 through the outlet 102 and the conduit 12.

During the implementation of the process, the ammonium concentrations in the water upstream and in the reactor as well as the nitrate concentrations in the water upstream and in the reactor are measured online and continuously using the sensors 13, 14, 15 and 16 and the controller 17. The value of the measurements will then be known at each instant throughout the process. In one variant, these concentrations could be measured intermittently according to a predetermined frequency. The value of the measurements will then be known at a chosen time frequency throughout the process. They could also be measured not online but after the samples have been taken. In this case, the samples will be taken by means of an automatic sample-taking system (automatic sampler) continuously or discontinuously at an adapted sampling frequency. The samples taken will be analyzed on the production site continuously or intermittently at an appropriate predetermined frequency of analysis. The value of the measurements will then be known at a chosen time frequency throughout the process.

The controller 17 then computes the following in real time:
the quantity of nitrates formed in the reactor ($Q_{NO3\ Formed}$) by subtracting the nitrates concentration of the treated water in the reactor ($Q_{NO3\ In}$) from that of the water to be treated upstream to the reactor ($Q_{NO3\ Inlet}$);
the quantity of ammonium reduced in the reactor ($Q_{NH4\ Reduced}$) in subtracting the ammonium concentration of the water to be treated upstream to the reactor ($Q_{NH4\ Inlet}$) from that of the water treated in the reactor ($Q_{NH4\ In}$);
the ratio between the quantity of nitrates formed ($Q_{NO3\ Formed}$) and the quantity of ammonium reduced ($Q_{NH4\ Reduced}$) according to the formula:

$$Ratio = (Q_{NO3\ Formed})/(Q_{NH4\ Reduced})$$

the percentage of ammonium reduced in said reactor according to the formula:

$$\%\ NH_{4\ reduced} = (Q_{NH4\ Reduced})/(Q_{NH4\ Inlet})$$

The controller 17 then determines:
the contribution, to the variation in the set value in oxygen input, of the Ratio, i.e. what should be the variation of the set value of oxygen input, given the value of Ratio;
the contribution, to the variation in the set value of oxygen input, of $\%\ NH_{4\ reduced}$, i.e. what should be the variation of the set value of oxygen input, given the value of $\%\ NH_{4\ reduced}$.

A variation in the set value of oxygen input $\Delta O_2$ is then determined by taking the sum of these two contributions. This variation may be positive or negative.

A new set value of oxygen input is computed by adding the variation in set value of oxygen input $\Delta O_2$ to the current set value of oxygen input in the reactor.

The set value of oxygen input is computed in real time. In variants, it could be computed according to a predetermined time slot.

B/ Detailed Example

A process according to the invention of the "nitritation-deammonification" type was implemented continuously within a plant comprising an MBBR type reactor 10.

The volume of this reactor 10 was equal to two cubic meters. It contained a volume of one cubic meter of supports made of plastic material enabling the biomass to grow in the form of a biofilm.

The reactor 10 was supplied continuously with an ammonium charged effluent (700 to 900 mgN-$NH_4$/L) coming from supernate of wastewater sludge anaerobic digesters.

During the implementation of such process, the operator in charge of the treatment of the water preliminarily set the following parameters on the basis of the working constraints:
the minimum permissible percentage of ammonium reduction;
the target percentage of ammonium reduction;
the target value of Ratio;
the maximum permissible value for the value of Ratio;
the interval in variation of the set value of dissolved $O_2$
the coefficient of scaling of the variation in the set value of dissolved $O_2$;
the period of computation, i.e. the duration between each new computation of a set value of aeration.

In this example, the following values were determined:
the minimum permissible percentage of ammonium reduction: 60%
the target percentage of ammonium reduction: 90%
the target value of Ratio: 8%
the maximum permissible value for the value of Ratio: 15%
the interval of variation of the set value in dissolved $O_2$: between 1.0 and 3.5 $mgO_2$ dissolved/L
the coefficient of scaling of the variation in the set value in dissolved $O_2$: 0.2
the computation period: 5 minutes Then operator then fixed the requisite maximum contributions of Ratio and of % $NH_{4\ reduced}$ to the variation in the set value of dissolved oxygen:

for Ratio greater than or equal to maximum Ratio which, in this example, is equal to 15%, the contribution of this parameter to the variation in set value was fixed at −1 whereas for a Ratio lower than or equal to the target Ratio which in this example was equal to 8%, the contribution of this parameter to the variation in set value was set at 0. For Ratio ranging between 15% and 8%, the contribution to the variation in the set value was between −1 and 0 linearly.

for % $NH_{4\ reduced}$ lower than or equal to minimum % $NH_{4\ reduced}$ which, in this example, is equal to 60%, the contribution of this parameter to the variation in the set value was fixed at +1 whereas for % $NH_{4\ reduced}$ greater than or equal to target % $NH_{4\ reduced}$ which, in this example, is equal to 90%, the contribution of this parameter to the variation in set value was fixed at 0. For a % $NH_{4\ reduced}$ ranging from 60% to 90%, the contribution to the variation in set value was from +1 to 0 linearly.

The implementation of the measuring means 13, 14, 15, 16 and 21 led to determining the following values at a given moment:

$Q_{NH4\ Inlet}$=600 mgN/L
$Q_{NH4\ Outlet}$=120 mgN/L
$Q_{NO3\ Inlet}$=0 mgN/L
$Q_{NO3\ Outlet}$=45 mgN/L
$Q_{O2}$=2.5 mgO$_2$/L From these values, the controller 17 determines the following values:

Ratio=9.4%
% $NH4_{reduced}$=80%

The controller 17 then, on the basis of the values of Ratio and % $NH4_{reduced}$, determined the respective contributions of these quantities to the variation in set value of dissolved oxygen.

A % $NH4_{reduced}$ of 80% corresponds to a contribution to the variation of set value of dissolved oxygen of +0.33 and a Ratio of 9.4% corresponds to a contribution to the variation of set value of −0.2.

The variation in set value of dissolved oxygen is equal to the sum of the contribution of each of the factors taken into account (giving here +0.13) multiplied by a scaling coefficient (here 0.2) giving, in this example +0.026 mgO$_2$/L.

The new set value of dissolved oxygen which is equal to the sum of the current set value (in this case 2.5 mgO$_2$/L) and the variation in the value (herein computed at +0.026 mgO$_2$/L) is then computed by the controller and is equal to 2.526 mgO$_2$/L.

C/ Trials

Figure 6:
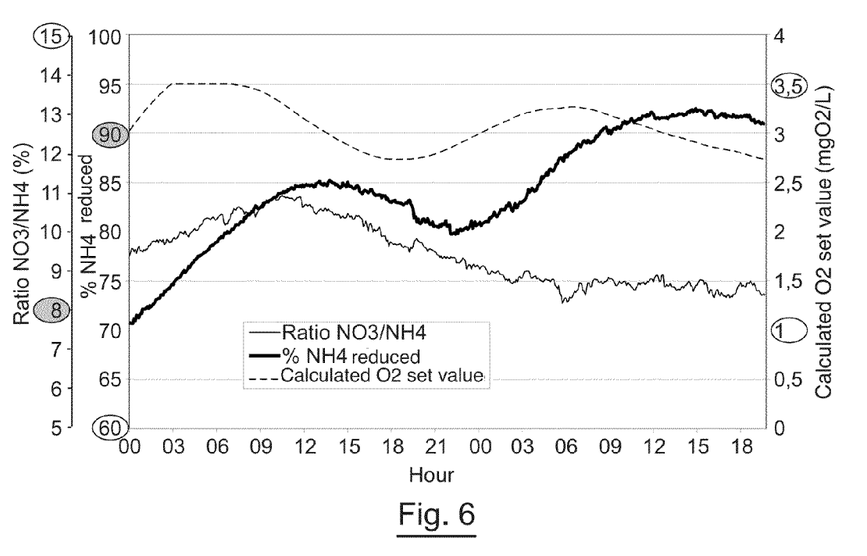
FIG. 6 illustrates the progress of the set value of dissolved oxygen input determined during trials by the implementation of the technique of the invention.

FIG. 6 presents the results obtained during the implementation of the invention, in the example described in detail here above, for 48 hours. As a reminder, the target value of Ratio was 8% and that of % $NH_{4reduced}$ was 90%. The maximum permissible value of Ratio was 15% and the minimum value of % $NH_{4reduced}$ was 60%. The set value of dissolved O$_2$ computed by the controller could vary between 1.0 and 3.5 mgO$_2$/L.

Initially (from t=0 to t=9 h00), the contribution of % $NH4_{reduced}$ to the variation in the set value was greater than the contribution of Ratio. Consequently, the variation in set value of dissolved oxygen is positive, implying that the set value of dissolved O$_2$ computed by the controller increases, until it reaches the maximum value set by the operator, in this case 3.5 mgO$_2$/L.

In a second stage (from t=9 h00 to t=18 h00), the contribution of Ratio to the variation in set value is greater than the contribution of % $NH4_{reduced}$. Consequently, the variation in the set value of O$_2$ is negative, implying that the set value of dissolved O$_2$ computed by the controller diminishes.

In a third stage (from t=18 h00 to t=6 h00, second day), the contribution of Ratio becomes less important than the contribution of the % $NH4_{reduced}$, implying that the variation in the set value of dissolved O$_2$ gets cancelled out and then becomes positive again. Consequently, the set value of dissolved O$_2$ computed by the controller gets stabilized at about 2.7 mgO$_2$/L and then increases again.

Finally, in a fourth stage (starting from t=9 h on the second day) the contribution of % $NH_{4reduced}$ reduced becomes zero inasmuch as the percentage has crossed the target value fixed by the operator, in this case 90%. Consequently, the variation in the set value of dissolved O$_2$ depends solely on the contribution of Ratio. Ratio is slightly higher than the target value, in this case 8%, and hence the variation in the set value of dissolved O$_2$ is negative, implying that the set value of dissolved O$_2$ computed by the controller gradually diminishes.

7.3.2 Working in Sequential Mode

A process of water treatment by nitritation-denitritation according to the invention, working in sequential mode, shall now be described.

Such a process comprises:
a step (i) for supplying water to the biological reactor 10;
an aerated nitritation step (ii);
an anoxic denitritation step (ii');
a step (iii) for extracting treated water from said reactor.

The step (i) for supplying water consists in introducing water to be treated circulating in the conduit 11 into the reactor 10 through the inlet 101 until the reactor 10 is filled.

Oxygen is injected into the reactor 10 through the pressure booster 18, the conduit 19 and the array 20.

An activity of the AOB bacteria is then observed inside the sequential biological reactor 10 during the aerated nitritation step (ii).

During the aerated nitritation step (ii), the AOB bacteria act on the ammonium ions present in water contained in the sequential biological reactor 10 to form nitrites in consuming oxygen.

The aerated nitritation step (ii) is followed by an anoxic denitritation step (ii').

The anoxic denitritation step (ii') may equally well implement either heterotrophic bacteria or anammox bacteria to break down the nitrites into molecular nitrogen gas during the anoxic denitritation stages. In the former case, it will be consist of a "nitrates-shunt" type process. In the latter case, it will be a "nitritation-deammonification" type process.

When the process is of the "nitrates-shunt" type, the heterotrophic bacteria act during the anoxic denitritation step (ii') on the nitrites present in the water contained in the sequential biological reactor 10 to form molecular nitrogen gas by consuming the carbon substrate present in the sequential biological reactor 10. The anoxic denitritation step (ii') may include a step for adding carbon to the sequential biological reactor 10.

When the process is of the "nitritation-deammonification" type, the anammox bacteria act during the anoxic denitritation step (ii') on the ammonium and on the nitrites present in the water to form molecular nitrogen gas.

Once the entire volume of water contained in the reactor 10 is treated, the stirring process within the reactor 10 is stopped so that the water contained in the reactor undergoes decantation.

The treated water, separated from the activated sludge, is then extracted from the reactor through the outlet 102 and the conduit 12.

In this embodiment, the reactor is entirely filled during the supply step (i) and all its total volume is treated during the implementation of the process. In one variant, the total volume of water to be treated could be treated in successive portions. In this case, a portion of the volume of water to be treated will be introduced into the reactor during a first supply step. This portion of water will then undergo nitritation and then denitritation. New steps of supply, aerated nitritation and then anoxic denitritation will be carried out so as to gradually treat the total volume of water to be treated likely to be contained in the reactor. The treated water will then undergo decantation before it is extracted from the reactor.

During the implementation of the process, the ammonium and nitrate concentrations in water present in the reactor are measured online and continuously by means of sensors planned for this purpose and the controller 17. The value of the measurements will then be known at each instant throughout the process. In one variant, these concentrations could be measured intermittently at a predetermined frequency. The value of the measurements will then be known at a chosen time frequency throughout the process. They could also be measured not online but after samples have been taken. In this case, the samples will be taken by means of an automatic sample-taking system (automatic sampler) continuously or discontinuously at an appropriate sampling frequency. The samples taken will be analyzed on the production site continuously or intermittently at an appropriate predetermined frequency of analysis. The value of the measurements will then be known at a chosen time frequency throughout the process.

The concentrations measured at the end of each supply step give an image of the composition of the water to be treated in the reactor. The concentration subsequently measured during the biological treatment enables an image to be obtained of the composition of the treated water, more specifically that of water being treated in said reactor.

The controller then computes the following in real time:
the quantity of nitrates formed in the reactor ($O_{NO3\ Formed}$) during the aerated nitritation step (ii) by subtracting of the nitrate concentration of the treated water measured during the aerated step ($Q_{NO3\ Treated\ Water}$) from the nitrate concentration of water to be treated measured at the end of the supply step (i) ($Q_{NO3\ Water\ to\ be\ Treated}$);
the quantity of ammonium reduced in the reactor ($Q_{NH4\ Reduced}$) during the aerated nitritation step (ii) by subtracting the ammonium concentration of water to be treated measured at the end of this supply step (i) ($Q_{NH4\ Water\ to\ be\ Treated}$) from that of the treated water measured during the aerated step ($Q_{NH4\ Treated\ Water}$);
the ratio between the quantity of nitrates formed ($Q_{NO3\ Formed}$) and the quantity of ammonium reduced ($Q_{NH4\ Reduced}$) according to the formula:

$$\text{Ratio} = (Q_{NO3\ Formed})/(Q_{NH4\ Reduced})$$

the percentage of reduced ammonium in said reactor according to the formula:

$$\%\ NH_{4\ reduced} = (Q_{NH4\ Reduced})/(Q_{NH4\ To\ be\ treated\ Water})$$

The controller 17 then determines:
the contribution of Ratio to the variation in set value of oxygen input, i.e. what the variation in set value should be, in terms of oxygen input, given the value of the Ratio;
the contribution of $\%\ NH_{4\ reduced}$ to the variation in set value of oxygen input, i.e. what the variation in set value of oxygen input should be, given the value of $\%\ NH_{4\ reduced}$.

A variation in the set value of oxygen input $\Delta O_2$ is then determined by taking the sum of these two contributions. This variation may be positive or negative.

A new set value of oxygen input is computed in adding a variation of set value of oxygen input $\Delta O_2$ to the current set value of oxygen input in the reactor.

The set value of oxygen input is computed in real time. In some variants, it could be done according to a predetermined time interval.

The mode of determining the set value of oxygen input is not described in detail here. It can be similar to the one described in the context of a treatment process working in continuous mode.

Whatever the embodiment implemented, the set value of aeration delivered by the controller could be bounded so as to prevent its value from being aberrant. This set value could have a maximum limit and/or a minimum limit.

The invention claimed is:

1. A process for treating water comprising ammonium within a biological reactor, the process comprising
supplying the biological reactor with the water;
determining a quantity of nitrates formed in the reactor and a quantity of ammonium reduced in the reactor;
computing a ratio between the quantity of nitrates formed in the reactor and the quantity of ammonium reduced in the reactor;
determining a percentage of ammonium reduced in the reactor;
aerating the water by injecting oxygen into the reactor, wherein the intake of oxygen into the reactor is determined as a function of the ratio between the quantity of nitrates formed in the reactor and the quantity of ammonium reduced in the reactor and as a function of the percentage of ammonium reduced in the reactor; and
extracting treated water from the reactor.

2. The process according to claim 1, wherein determining the quantity of nitrates formed in the reactor and the quantity of ammonium reduced in the reactor is implemented continuously.

3. The process according to claim 1, wherein determining the quantity of nitrates formed in the reactor and the quantity of ammonium reduced in the reactor is implemented intermittently according to a predetermined frequency.

4. The process according to claim 1, wherein the process for treating water comprising ammonium within a biological reactor is a nitritation-denitritation process.

5. The process according to claim 1, wherein the process for treating water comprising ammonium within a biological reactor is a nitritation-deammonification process.

6. The process according to claim 1, further comprising
determining a variation in set value of oxygen intake as a function of the ratio between the quantity of nitrates formed in the reactor and the quantity of ammonium reduced in the reactor and as a function of the percentage of ammonium reduced in the reactor; and
determining a new value of oxygen intake corresponding to the sum of a current set value of oxygen intake into the reactor and the set value of variation in oxygen intake.

7. The process according to claim 6, further comprising
determining a first contribution to the variation in set value of oxygen intake from the ratio between the quantity of nitrates formed in the reactor and the quantity of ammonium reduced in the reactor; and determining a second contribution to the variation in set value of oxygen intake from the percentage of ammonium reduced in the reactor, wherein the variation in set value of oxygen intake is a function of the first and second contributions.

8. The process of claim 1, further comprising tracking the progress, over time, of the value of the ratio between the quantity of nitrates formed in the reactor and the quantity of ammonium reduced in the reactor; and reducing the quantity of oxygen injected into the reactor when the value of the ratio increases.

9. The process of claim 1, further comprising comparing the value of the percentage of ammonium reduced in the reactor with a threshold value; and increasing the quantity of oxygen injected into the reactor when the value of the percentage is lower than said threshold value.

10. The process of claim 1, further comprising measuring a first nitrate concentration of the water, wherein the measurement is taken upstream of the reactor; and measuring a second nitrate concentration of the water, wherein the measurement is taken in or downstream from said reactor, wherein determining the quantity of nitrates formed in the reactor includes comparing the first nitrogen concentration with the second nitrogen concentration.

11. The process as claimed in claim 1, further comprising measuring a first ammonium concentration of the water, wherein the measurement is taken upstream of the reactor; and measuring a second ammonium concentration of the water, wherein the measurement is taken in or downstream from the reactor, wherein determining the quantity of ammonium reduced in the reactor includes comparing the first ammonium concentration with the second ammonium concentration.

12. The process of claim 10, wherein measuring nitrate concentration occurs continuously or intermittently.

13. The method of claim 1 wherein the reactor is a deammonification biofilm reactor having biofilm carriers and wherein biomass supported by the biofilm carriers simultaneously nitrify and denitrify ammonium through a nitritation-deammonification process.

14. The method of claim 13 wherein the biomass supported on the biofilm carriers include aerobic ammonium oxidizing bacteria (AOB) and anaerobic ammonium oxidizing bacteria (ANAMMOX).

15. The process of claim 1, wherein the intake of oxygen into the reactor is further determined according to a predetermined time interval.

16. A plant for treating water including ammonium, the plant comprising a reactor;

a first concentration sensor for measuring a first ammonium concentration, wherein the first sensor is positioned upstream of the reactor;

a second concentration sensor for measuring a second ammonium concentration, wherein the second sensor is positioned in the reactor or downstream of the reactor;

a third concentration sensor for measuring a first nitrate concentration, wherein the third sensor is positioned upstream of the reactor;

a fourth concentration sensor for measuring a second nitrate concentration, wherein the fourth sensor is positioned in the reactor or downstream of the reactor;

an oxygen injecting apparatus for injecting oxygen into the reactor; and at least one controller is configured to compute the reduction in ammonium in the reactor, the increase in concentration of nitrates formed in the reactor, a ratio between the increased concentration of nitrates and the reduced concentration of ammonium, a percentage of ammonium reduced, and an oxygen intake based upon the ratio and percentage of reduction.

* * * * *